(12) United States Patent
McLoughlin et al.

(10) Patent No.: US 8,314,505 B2
(45) Date of Patent: Nov. 20, 2012

(54) GAS TURBINE ENGINE APPARATUS

(75) Inventors: Adam John McLoughlin, Derby (GB); Stephen John Mountain, Derby (GB)

(73) Assignee: Rolls-Royce, PLC, London (GB)

( * ) Notice: Subject to any disclaimer, the term of this patent is extended or adjusted under 35 U.S.C. 154(b) by 408 days.

(21) Appl. No.: 12/436,843

(22) Filed: May 7, 2009

(65) Prior Publication Data

US 2009/0289456 A1    Nov. 26, 2009

(30) Foreign Application Priority Data

May 23, 2008    (GB) .................................. 0809336.1

(51) Int. Cl.
*F01D 15/10*    (2006.01)
(52) U.S. Cl. ........... 290/40 C; 290/46; 290/52; 60/226.1
(58) Field of Classification Search ................ 290/40 C, 290/46, 52; 60/226.1–226.3, 262, 668, 778, 60/791
See application file for complete search history.

(56) References Cited

U.S. PATENT DOCUMENTS

| | | | |
|---|---|---|---|
| 4,796,424 A * | 1/1989 | Farrar et al. ...................... 60/268 |
| 5,272,868 A * | 12/1993 | Ciokajlo et al. ............. 60/39.08 |
| 5,376,827 A * | 12/1994 | Hines .............................. 290/52 |
| 7,514,810 B2 * | 4/2009 | Kern et al. ...................... 290/52 |
| 2002/0178725 A1 * | 12/2002 | Dev ................................ 60/723 |
| 2008/0000233 A1 * | 1/2008 | Althaus et al. .................. 60/659 |
| 2008/0095615 A1 * | 4/2008 | Bradbrook et al. ........... 415/145 |

FOREIGN PATENT DOCUMENTS

| | | |
|---|---|---|
| EP | 1881161 A2 | 1/2008 |
| GB | 1084857 | 9/1967 |
| WO | 2006/069434 A1 | 7/2006 |
| WO | 2006091142 A1 | 8/2006 |

* cited by examiner

*Primary Examiner* — Tran Nguyen
(74) *Attorney, Agent, or Firm* — McCormick, Paulding & Huber LLP

(57) ABSTRACT

A gas turbine engine arrangement comprises a core engine, a power turbine and a propulsor. The core engine comprises at least one compressor and at least one turbine arranged to drive the at least one compressor and the core engine is arranged in a casing. The power turbine is positioned downstream of the at least one turbine and the power turbine is arranged to drive the propulsor. An electrical machine is arranged upstream of the at least one compressor. The electrical machine comprises a stator and a rotor and the electrical machine comprises a motor/generator. A first clutch selectively connects the rotor of the electrical machine to the power turbine and a second clutch selectively connects the rotor of the electrical machine to the at least one compressor of the core engine.

14 Claims, 2 Drawing Sheets

GAS TURBINE ENGINE APPARATUS

CROSS REFERENCE TO RELATED APPLICATION

This application is entitled to the benefit of British Patent Application No. GB 0809336.1, filed on May 23, 2008.

FIELD OF THE INVENTION

The present invention relates to a gas turbine engine apparatus and in particular to a turbo-propeller gas turbine engine apparatus.

BACKGROUND OF THE INVENTION

Currently, gas turbine engines require a number of accessories to be driven from a core engine of the gas turbine engine. The accessories include fuel pumps, oil pumps, hydraulic pumps, electrical generators, etc. Normally, the accessories are driven by an accessory gearbox mounted on a casing of the gas turbine engine. The accessory gearbox is driven by the core engine via a radial drive shaft, which is driven by a shaft of a high-pressure rotor or an intermediate pressure rotor of the core engine.

The provision of the accessory gearbox on the casing of the gas turbine engine produces deviations to the aerodynamic flow lines of the casing around the accessory gearbox, resulting in a loss of aerodynamic flow around the casing of the gas turbine engine.

Open rotor gas turbine engines, or turbo-propeller gas turbine engines, suffer from a difficulty of providing in flight restarting of the gas turbine engine during windmilling, because there is little aerodynamic coupling between the blades of the open rotor, or blades of the propeller, and the core engine of the gas turbine engine.

SUMMARY OF THE INVENTION

Accordingly, the present invention seeks to provide a novel gas turbine engine arrangement, which reduces, preferably overcomes, the above mentioned problem.

Accordingly, the present invention provides a gas turbine engine apparatus includes a core engine, a power turbine and a propulsor, the core engine having at least one compressor and at least one turbine arranged to drive the at least one compressor, the core engine is arranged in a casing, the power turbine is positioned downstream of the at least one turbine, the power turbine is arranged to drive the propulsor, an electrical machine is arranged upstream of the at least one compressor, the electrical machine includes a stator and a rotor, the electrical machine has a motor/generator, a first clutch to selectively connect the rotor of the electrical machine to the power turbine and a second clutch to selectively connect the rotor of the electrical machine to the at least one compressor of the core engine.

Preferably, the electrical machine is arranged coaxially with the core engine, the power turbine and the propulsor.

Preferably, a nose cone is arranged upstream of the at least one compressor, the electrical machine being arranged in the nose cone.

Preferably, the nose cone is secured to the core engine casing.

Preferably, the electrical machine stator is secured to the nose cone or the core engine casing.

Preferably, the propulsor is arranged downstream of the at least one turbine.

Alternatively, the propulsor may be arranged upstream of the at least one compressor. The electrical machine stator may be secured to the core engine casing.

Preferably, the propulsor is a propeller; alternatively, the propulsor may be a fan.

Preferably, the first clutch is a dog clutch, a friction clutch, an electromagnetic clutch, a Theological clutch or a fluidic clutch.

Preferably, the second clutch being a dog clutch, a friction clutch, an electromagnetic clutch, a Theological clutch or a fluidic clutch.

Alternatively, the first clutch and/or the second clutch may be a variable clutch to allow variable transfer of power between the power turbine and the at least one compressor.

Preferably, the core engine comprises a low-pressure compressor, a high-pressure compressor, a high-pressure turbine arranged to drive the high-pressure compressor and a low-pressure turbine arranged to drive the low-pressure compressor.

The present invention also provides a method of operating a gas turbine engine arrangement having a core engine, a power turbine and a propulsor. The core engine itself has at least one compressor and at least one turbine arranged to drive the at least one compressor. The core engine is arranged in a casing. The power turbine is positioned downstream of the at least one turbine which is arranged to drive the propulsor. There is an electrical machine upstream of the at least one compressor that has a stator and a rotor, a motor/generator, a first clutch to selectively connect the rotor of the electrical machine to the power turbine, and a second clutch to selectively connect the rotor of the electrical machine to the at least one compressor of the core engine. The method includes, in a first mode of operation, the steps of disconnecting the rotor of the electrical machine from the power turbine using the first clutch and connecting the rotor of the electrical machine to the at least one compressor using the second clutch and operating the electrical machine as an electrical motor such that the electrical machine starts the gas turbine engine. A second mode of operation includes the steps of disconnecting the rotor of the electrical machine from the at least one compressor using the second clutch and connecting the rotor of the electrical machine to the power turbine using the first clutch and operating the electrical machine as an electrical generator such that the power turbine drives the rotor of the electrical machine to generate electricity. A third mode of operation includes the steps of connecting the power turbine and the rotor of the electrical machine using the first clutch and connecting the rotor of the electrical machine and the at least one compressor using the second clutch such that the power turbine drives the at least one compressor.

Preferably, the method also has the step of operating in the third mode to transfer power from the power turbine to the at least one compressor to improve the stability of the core engine.

Alternatively, the method includes the step of operating in the third mode to transfer power from the power turbine to the at least one compressor such that the power turbine restarts the gas turbine engine during windmilling of the gas turbine engine

DETAILED DESCRIPTION OF THE PREFERRED EMBODIMENTS

Figure 1:
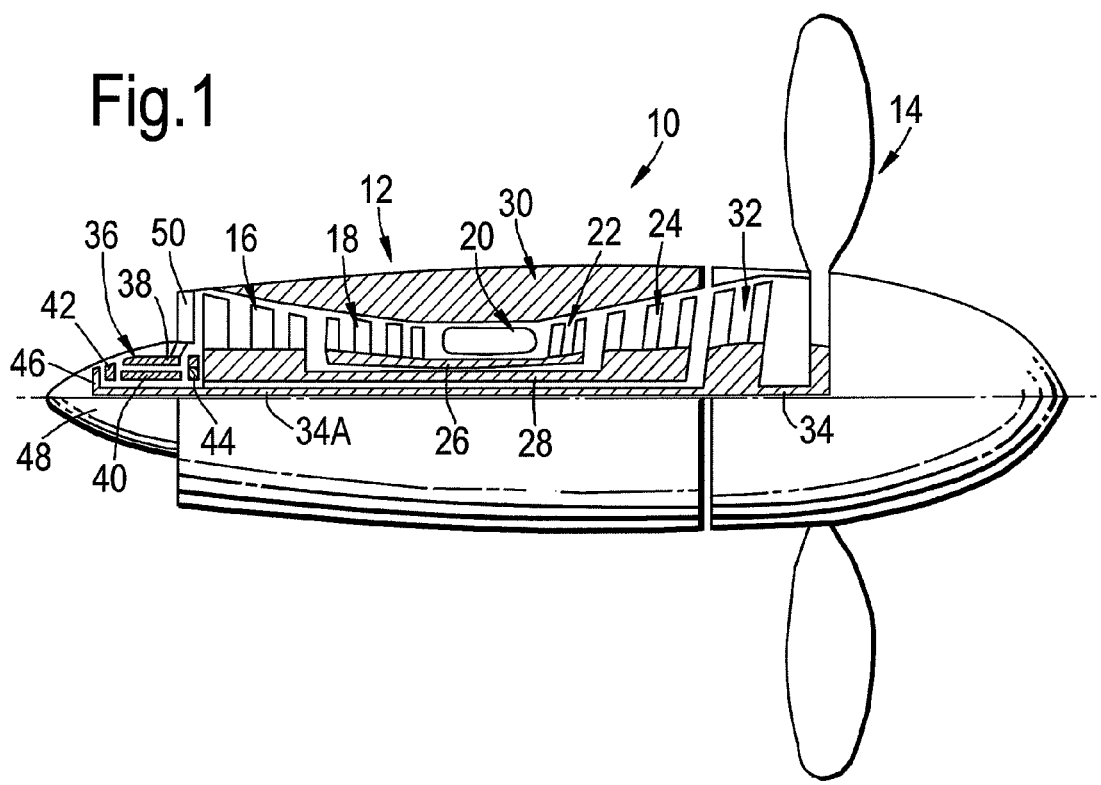
FIG. 1 is a simplified schematic illustration that shows a turbo-propeller gas turbine engine arrangement according to the present invention.
Figure 2:
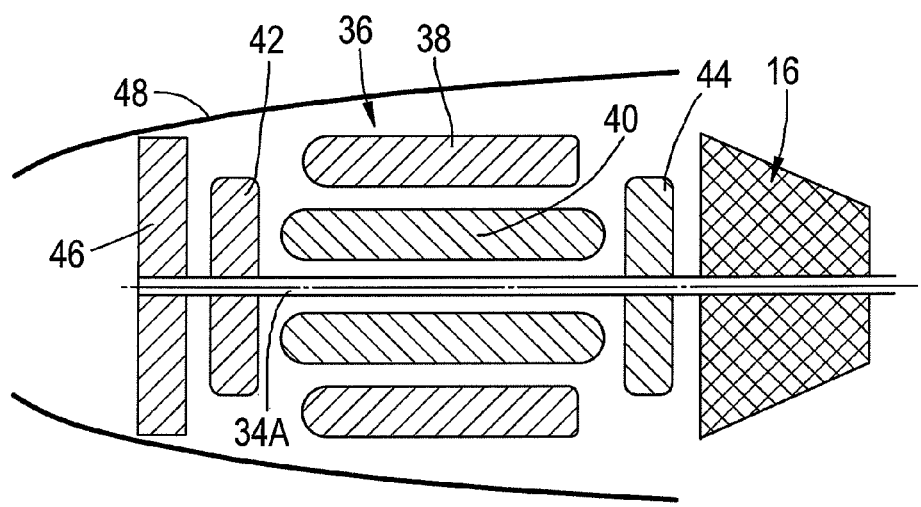
FIG. 2 is a simplified schematic illustration that is an enlargement of a portion of the turbo-propeller gas turbine engine shown in FIG. 1.

A turbo-propeller gas turbine engine 10 according to the present invention, as shown in FIGS. 1 and 2, comprises a core engine 12 and a propeller 14 positioned downstream of the core engine 12. The turbo-propeller gas turbine engine 10 is of the pusher type. The core engine 12 comprises a low-pressure compressor 16, a high-pressure compressor 18, a combustor 20, a high-pressure turbine 22 and a low-pressure turbine 24 arranged in axial flow series. The high-pressure turbine 22 is arranged to drive the high-pressure compressor 18 via a high-pressure shaft 26 and the low-pressure turbine 24 is arranged to drive the low-pressure compressor 16 via a low-pressure shaft 28. The core engine 12 is arranged in a core engine casing 30.

A power turbine 32 is positioned downstream of the low-pressure turbine 24 and the power turbine 32 is arranged to drive the propeller 14 via a shaft 34. The propeller 14 is arranged downstream of the low-pressure turbine 24.

An electrical machine 36 is arranged upstream of the low-pressure compressor 16. The electrical machine 36, as shown in FIG. 2, comprises a stator 38 and a rotor 40 and the electrical machine 36 is an electrical motor/electrical generator. The power turbine 32 is also arranged to drive the electrical machine 36 via an upstream extending portion 34A of shaft 34. The portion 34A of shaft 34 extends coaxially through the low-pressure shaft and the high-pressure shaft 26 and 28 respectively. The upstream end of the portion 34A of the shaft 34 has a radially extending drive flange 46.

A first clutch 42 is positioned axially between the electrical machine 36 and the drive flange 42 on the portion 34A of the shaft 34 and a second clutch 44 is positioned axially between the electrical machine 36 and the low-pressure compressor 16. The first clutch 42 selectively connects the rotor 40 of the electrical machine 36 to the drive flange 46 on the shaft 34 and hence to the power turbine 32 and the propeller 14 and the second clutch 44 selectively connects the rotor 40 of the electrical machine 36 to the low-pressure compressor 16 of the core engine 12. The first clutch 42 is a dog clutch, a friction clutch, an electromagnetic clutch, a Theological clutch or a fluidic clutch. The second clutch 44 is a dog clutch, a friction clutch, an electromagnetic clutch, a Theological clutch or a fluidic clutch. The first clutch 42 and/or the second clutch 44 may be a variable clutch to allow power transfer between the power turbine and the low-pressure compressor 16.

The electrical machine 36 is arranged coaxially with the core engine 12, the power turbine 32 and the propeller 14.

A nose cone 48 is arranged upstream of the low-pressure compressor 16 and the electrical machine 36 is arranged in the nose cone 48. The nose cone 46 is secured to the core engine casing 30, via a stage of inlet guide vanes 50 provided at the inlet of the core engine 12. The electrical machine 36, stator 38 is secured to the nose cone 48 or the core engine casing 30.

In operation air is compressed as it flows sequentially through the low and high-pressure compressors 16 and 18 respectively before it enters the combustor 20. Fuel is burnt in air in the combustor 20 and the resulting exhaust gases flow through and drive the high and low-pressure turbines 22 and 24, which in turn drive the high and low-pressure compressors 18 and 16 respectively. The exhaust gases leaving the low-pressure turbine 24 flow through and drive the power turbine 32, which in turn drives the propeller 14.

The turbo-propeller gas turbine arrangement 10 is arranged such that in a first mode of operation the rotor 40 of the electrical machine 36 is disconnected from the power turbine 32, the drive flange 46, using the first clutch 42 and the rotor 40 of the electrical machine 36 is connected to the low-pressure compressor 16 using the second clutch 44 and the electrical machine 36 is operated as an electrical motor such that the electrical machine 36 starts the turbo-propeller gas turbine engine 10. In a second mode of operation the rotor 40 of the electrical machine 36 is disconnected from the low-pressure compressor 16 using the second clutch 44 and the rotor 40 of the electrical machine 36 is connected to the power turbine 32, the drive flange 46, using the first clutch 42 and the electrical machine 36 is operated as an electrical generator such that the power turbine 32 drives the rotor 40 of the electrical machine 36 to generate electricity. In a third mode of operation the power turbine 32 and the rotor 40 of the electrical machine 36 are connected using the first clutch 42 and the rotor 40 of the electrical machine 36 and the low-pressure compressor 16 are connected using the second clutch 44 such that the power turbine 32 drives the low-pressure compressor 16.

Thus, in the first mode of operation, the electrical machine 36 acts as an electrical motor and torque is transmitted from the rotor 40 of the electrical machine 36 through the second clutch 44 to the low-pressure compressor 16 of the core engine 12 to effect starting of the turbo-propeller gas turbine engine 10. In the second mode of operation the electrical machine 36 acts an electrical generator and torque is transmitted from the power turbine 32 to the rotor 40 of the electrical machine 36, which produces electricity. In the first and third modes of operation, the first and second clutches 42 and 44 may be either a solid engagement type such as a dog clutch or a friction clutch or other suitable clutch or a variable engagement type such as an electromagnetic clutch, a Theological clutch or a fluidic clutch. In the third mode of operation, torque is transmitted from the power turbine 32 through the first clutch 42, the rotor 40 of the electrical machine 36 and the second clutch 44 to the low-pressure compressor 16 of the core engine 12. In the third mode of operation, one of the clutches must be of the variable type to allow "slip" between the two shafts, the shaft 34 and the shaft 28 that are likely to operate at different rotational speeds. When one of the clutches is allowed to "slip", power may be transferred at varying levels between the power turbine 32 and the core engine 12 to provide operability benefits and hence improve the stability of the gas turbine engine 10. In the third mode of operation, it is also possible to enable windmill relight/restart of the gas turbine engine 10 following an in-flight shut down of the gas turbine engine 10.

The positioning of the electric machine 36 upstream of the low-pressure compressor 16 of the core engine 12 and arranged coaxially with the rotor components of the core engine 12 and the propeller 14 allows torque to be transmitted from the power turbine 32 through a shaft 34/34A extending coaxially through the centre of the core engine 12 that is rated to carry the starting torque and/or the generating torque.

Figure 3:
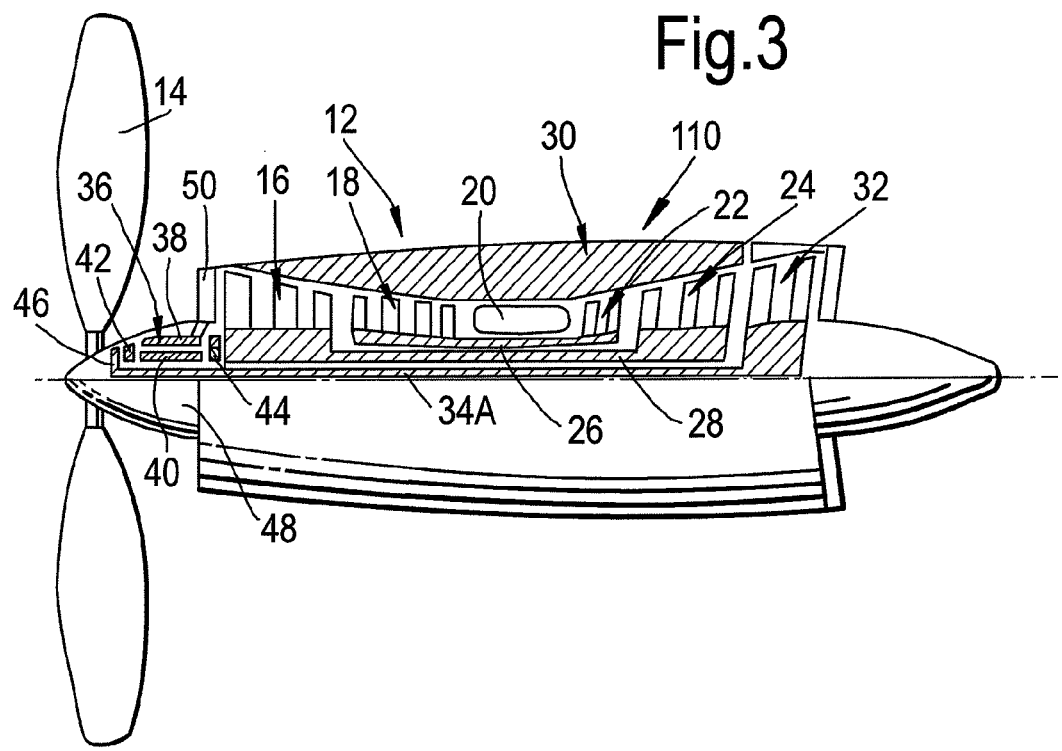
FIG. 3 is a simplified schematic illustration that shows a further turbo-propeller gas turbine engine arrangement according to the present invention.

A further turbo-propeller gas turbine engine 110 according to the present invention, as shown in FIG. 3, comprises a core engine 12 and a propeller 14 positioned upstream of the core engine 12. The turbo-propeller gas turbine engine 110 is of the puller type.

The turbo-propeller gas turbine engine 110 is substantially the same as that shown in FIGS. 1 and 2 and like parts are denoted by like numerals. The arrangement in FIG. 3 differs in that the power turbine 32 is downstream of the low-pressure turbine 24 and the propeller 14 is positioned upstream of the low-pressure compressor 16. The electric machine 36 is positioned axially between the propeller 14 and the low-pressure compressor 16. The electric machine 36 is secured to the core engine casing 30 and not within a nose cone. The driving flange may be part of the propeller 14.

Figure 4:
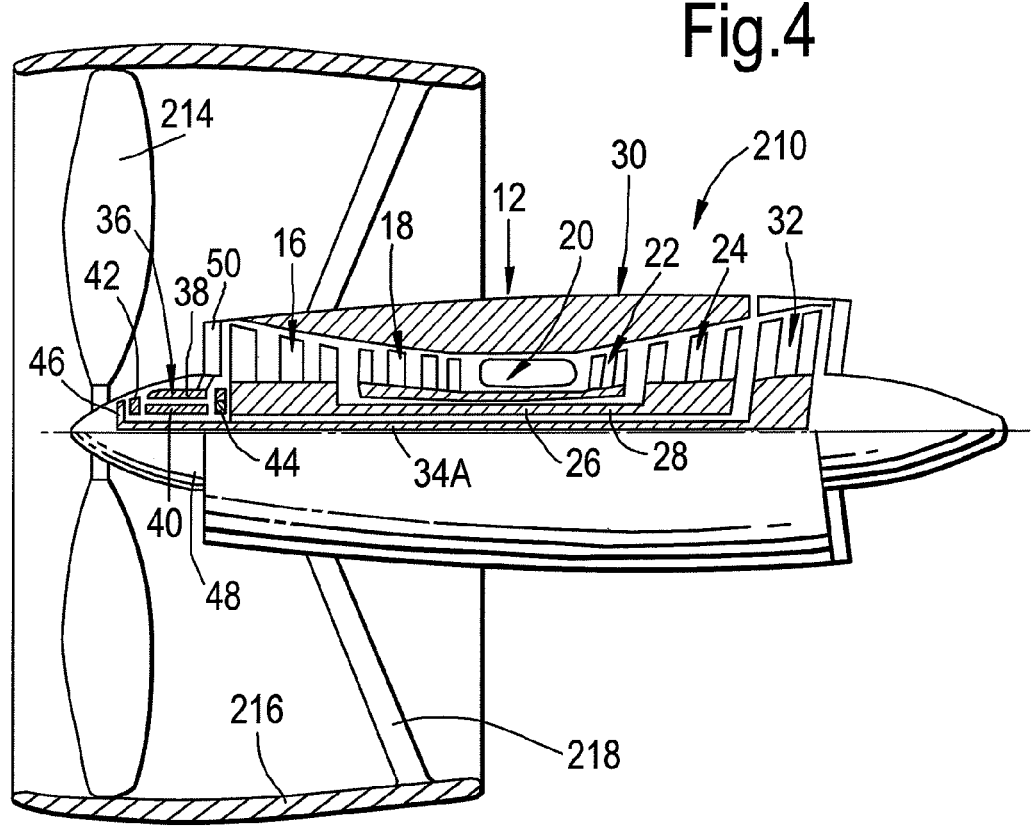
FIG. 4 is a simplified schematic illustration that shows a turbofan gas turbine engine arrangement according to the present invention.

A turbofan gas turbine engine 210 according to the present invention, as shown in FIG. 4, comprises a core engine 12 and a fan 214 positioned upstream of the core engine 12. The turbofan gas turbine engine 210 is substantially the same as that shown in FIGS. 1 and 2 and like parts are denoted by like numerals. The arrangement in FIG. 4 differs in that the power turbine 32 is downstream of the low-pressure turbine 24 and the fan 214 is positioned upstream of the low-pressure compressor 16. The electric machine 36 is positioned axially between the fan 214 and the low-pressure compressor 16. The electric machine 36 is secured to the core engine casing 30 and not within a nose cone. The driving flange may be part of the fan 214. In addition a fan casing 216 is arranged coaxially around the fan 214 and the fan casing 216 is secured to the core engine casing 30 via fan outlet guide vanes 218.

A propulsor may thus be a propeller and alternatively the propulsor may be a fan.

Although the present invention has been described with reference to a core engine comprising a low-pressure compressor, a high-pressure compressor, a combustor, a high-pressure turbine and a low-pressure turbine, the core engine may comprise a high-pressure compressor, a combustor and a high-pressure turbine.

What is claimed is:

1. A gas turbine engine apparatus comprising:
    a core engine arranged in a casing, said core engine having a propulsor, a compressor, a first turbine arranged to drive said compressor, and a power turbine positioned downstream of the first turbine, arranged to drive the propulsor;
    a stator and a rotor arranged upstream of the compressor and configured as a motor/generator;
    a first clutch operable to selectively connect the rotor of the motor/generator to the power turbine for acting as a generator; and
    a second clutch operable to selectively connect the rotor of the motor/generator to the compressor for acting as a motor;
    said first and second clutches operable together to connect the compressor to the power turbine via the rotor of the motor/generator for windmilling and/or power sharing.

2. A gas turbine engine apparatus as claimed in claim 1 wherein the motor/generator is arranged coaxially with the core engine, the power turbine and the propulsor.

3. A gas turbine engine apparatus as claimed in claim 1 wherein the nose cone is secured to the casing.

4. A gas turbine engine apparatus as claimed in claim 3 wherein the motor/generator stator is secured to the nose cone or the core engine casing.

5. A gas turbine engine apparatus as claimed in claim 1 wherein the propulsor is arranged downstream of the at least one turbine.

6. A gas turbine engine apparatus as claimed in claim 1 wherein the propulsor is arranged upstream of the at least one compressor.

7. A gas turbine engine apparatus as claimed in claim 6 wherein the motor/generator stator is secured to the core engine casing.

8. A gas turbine engine apparatus as claimed in claim 1 wherein the propulsor is selected from the group comprising a propeller and a fan.

9. A gas turbine engine apparatus as claimed in claim 1 wherein the first clutch is selected from the group comprising a dog clutch, a friction clutch, an electromagnetic clutch, a rheological clutch and a fluidic clutch.

10. A gas turbine engine apparatus as claimed in claim 1 wherein the second clutch is selected from the group comprising a dog clutch, a friction clutch, an electromagnetic clutch, a rheological clutch and a fluidic clutch.

11. A gas turbine engine apparatus as claimed in claim 1 wherein the first clutch and/or the second clutch is a variable clutch to allow transfer of power between the power turbine and the at least one compressor.

12. A gas turbine engine apparatus as claimed in claim 1 wherein the core engine comprises a low-pressure compressor, a high-pressure compressor, a high-pressure turbine arranged to drive the high-pressure compressor and a low-pressure turbine arranged to drive the low-pressure compressor.

13. A gas turbine engine as claimed in claim 1, wherein the rotor, the stator, the first clutch, and the second clutch are arranged within a nose cone of the gas turbine engine, said nose cone disposed upstream of the compressor.

14. A gas turbine engine as claimed in claim 1, wherein the motor/generator stator is secured to the core engine casing.

* * * * *